United States Patent
Dicke-Kuenitz

(10) Patent No.: US 9,359,155 B2
(45) Date of Patent: Jun. 7, 2016

(54) OFFSHORE LOADING SYSTEM

(75) Inventor: Martin Dicke-Kuenitz, Fernwald (DE)

(73) Assignee: EMCO WHEATON GMBH, Kirchhain (DE)

( * ) Notice: Subject to any disclaimer, the term of this patent is extended or adjusted under 35 U.S.C. 154(b) by 207 days.

(21) Appl. No.: 14/233,051

(22) PCT Filed: Jun. 22, 2012

(86) PCT No.: PCT/EP2012/062066
§ 371 (c)(1),
(2), (4) Date: Jan. 15, 2014

(87) PCT Pub. No.: WO2013/013911
PCT Pub. Date: Jan. 31, 2013

(65) Prior Publication Data
US 2014/0166156 A1    Jun. 19, 2014

Related U.S. Application Data

(60) Provisional application No. 61/512,587, filed on Jul. 28, 2011.

(30) Foreign Application Priority Data

Sep. 13, 2011    (DE) .................. 20 2011 051 271 U

(51) Int. Cl.
| | |
|---|---|
| *B67C 3/26* | (2006.01) |
| *B65G 67/60* | (2006.01) |
| *B63B 27/34* | (2006.01) |
| *B67D 9/02* | (2010.01) |
| *B63B 22/02* | (2006.01) |
| *B63B 27/24* | (2006.01) |
| *B63B 17/00* | (2006.01) |

(52) U.S. Cl.
CPC ............. *B65G 67/606* (2013.01); *B63B 27/34* (2013.01); *B67D 9/02* (2013.01); *B63B 22/021* (2013.01); *B63B 27/24* (2013.01); *B63B 2017/0072* (2013.01)

(58) Field of Classification Search
CPC ...... B63B 22/021; B63B 27/24; B63B 27/34; B63B 2017/0072; B65G 67/606; B65G 67/62; B67D 9/00; B67D 9/02
USPC ............................ 141/1, 279, 284, 387, 388
See application file for complete search history.

(56) References Cited

U.S. PATENT DOCUMENTS 3,126,913 A * 3/1964 Green .................. B67D 9/02
                                                    137/356
4,408,943 A    10/1983 McTamaney et al.
(Continued)

FOREIGN PATENT DOCUMENTS

FR        2 927 322 A1    8/2009
WO    WO 02/22491 A1    3/2002
(Continued)

OTHER PUBLICATIONS

Written Opinion of the International Searching Authority regarding PCT/EP2012/062066, mailed Oct. 15, 2012 (6 pages).
International Search Report regarding PCT/EP2012/062066, mailed Oct. 15, 2012 (6 pages).

*Primary Examiner* — Jason K Niesz
(74) *Attorney, Agent, or Firm* — Michael Best & Friedrich LLP

(57) ABSTRACT

A loading system comprising: a loading arm, said loading arm having a process pipe which provides a conduit to carry fluid during a process of loading the fluid by said loading arm; a control unit coupled to said loading arm, to direct a free end of said loading arm; an electronic logic controller coupled to said control unit; a first electronic sensor electronically coupled to said logic controller, said first electronic sensor adapted to detect movement of a first structure when said loading arm is mounted to said first structure, said movement relative to another second structure or the stationary world.

14 Claims, 2 Drawing Sheets

(56) References Cited

U.S. PATENT DOCUMENTS 8,742,941 B2 * 6/2014 Le Devehat ............ B63B 27/24
340/669
2010/0313977 A1 12/2010 Sylard

FOREIGN PATENT DOCUMENTS

| WO | WO 2007/059781 A1 | 5/2007 |
| WO | WO 2009/141676 A1 | 11/2009 |

* cited by examiner

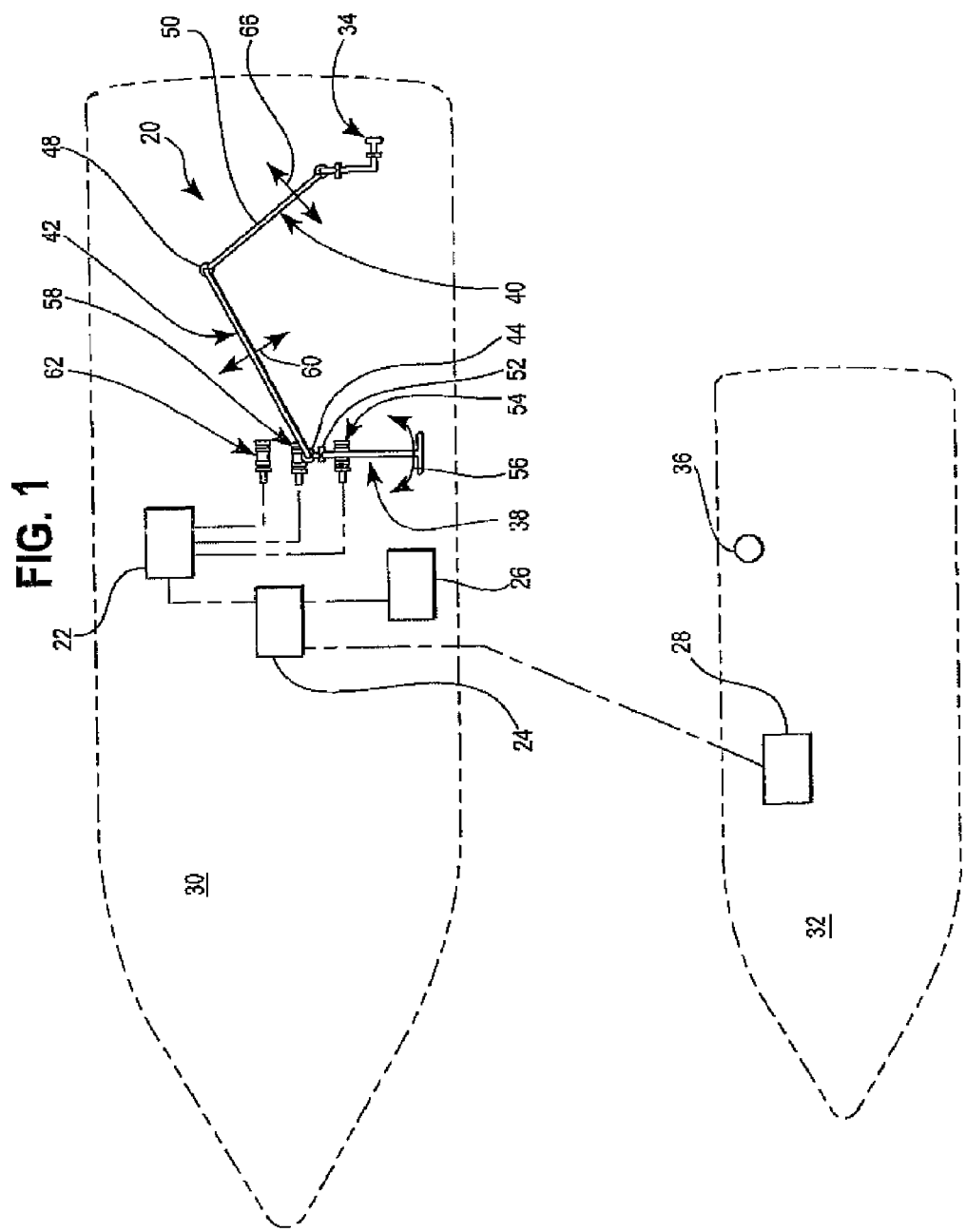

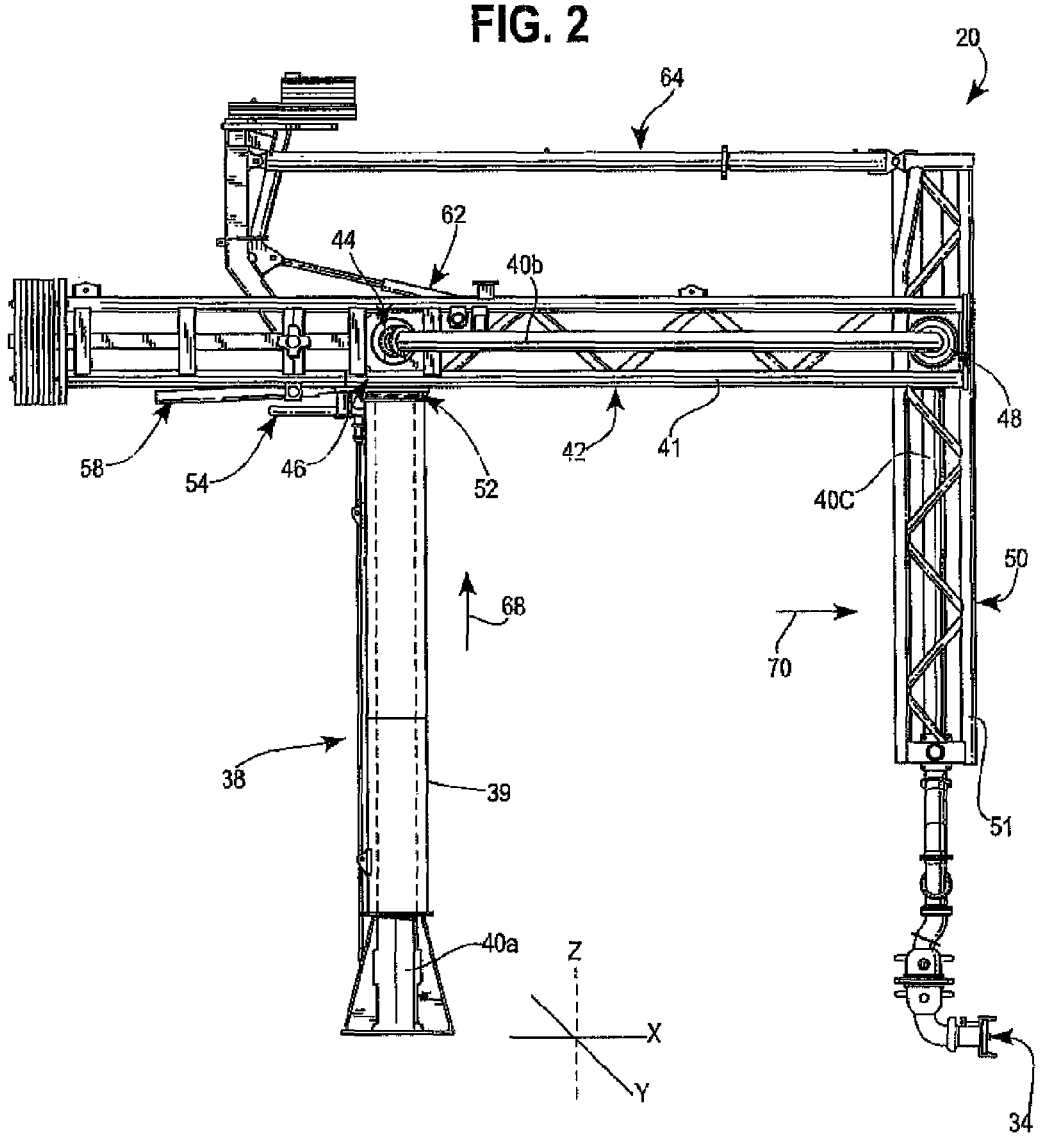

OFFSHORE LOADING SYSTEM

FIELD OF INVENTION

The present invention is directed to an offshore loading system having at least one loading arm coupled to a control unit, especially to a hydraulic power unit.

BACKGROUND OF INVENTION

U.S. Pat. No. 4,758,970, filed Aug. 8, 1984, and issued to Emco Wheaton, Inc. discloses a marine loading arm as an articulated device used to on-load or off-load fluids between a vessel and a loading region such as a dock, wharf or pier. Such devices are particularly useful in the petroleum transportation industry for which tremendous volumes of fluid must be transferred safely between the moored area and the dock. A marine loading arm typically includes a vertical mounting structure supporting a fulcrum about which a primary arm pivots. A secondary arm is pivotally linked to the primary arm and a counter weight is attached to the opposite end of the primary arm to balance the same about the fulcrum. The secondary arm has an end flange attached thereto which is coupled to a flange support on the vessel manifold to access the fluid. Three dimensional movement of the articulated arm, and, thus the end flange, is accomplished by pivotal movement of the primary arm about the fulcrum and the secondary arm pivoting with respect to the primary arm. Also the fulcrum is carried on an upper portion of the mounting structure which is rotably coupled to a lower portion of the mounting structure by a swing joint, thus allowing the articulated primary and secondary arms to move about the longitudinal axis of the mounting structure. Such a loading arm device can be controlled by hydraulic actuators of the piston cylinder type which pivot the articulated arm so as to position the end flange at a desired coupling location.

The '970 patent further discloses an apparatus for monitoring the spatial position of a reference point relative to a predetermined origin, the reference point being located on an articulated marine loading arm having a plurality of pivotally interconnected fluid conduits forming pivot angles at the interconnections of the conduits. The apparatus includes segments subtended by the pivot angles with means for sensing the length of the segments as the loading arm articulates. The dispensing means generates electrical signals proportional to segment lengths and a computer receives the electrical signals and calculates the position of the reference point based on the known geometry of the loading dock.

U.S. Pat. No. 6,938,643, filed Jul. 31, 2003, and issued to Single Buoy Moorings, Inc., discloses a storage structure having a fluid transfer boom for transfer of cryogenic liquids such as liquid natural gas from a first storage structure to a vessel. The boom has two arms which are rotably connected at their ends via a swivel joint. A liquefied natural gas duct is supported within the first and second arms which form a gas tight housing around the liquefied natural gas duct. The transfer boom provides a redundant containment system wherein the liquid natural gas (LNG) duct is supported by the structurally strong and self supporting transfer boom which contains the natural gas in case of a leak in the inner (LNG) duct. The transfer boom can have 7 swivel joints in total such that rotation in all directions is possible when the vessel is moored to the storage structure and has to cope with relative motions of yaw, pitch, roll, heave, sway and surge. The storage structure may for instance be an off shore storage buoy for liquefied natural gas which is anchored to the sea bed by means of anchor lines. The storage structure can be a weather waning vessel.

International Patent Publication WO 2007/120039, filed Feb. 28, 2007 discloses a vessel with a motion compensation platform. The platform is provided with at least one carrier for bearing, moving or transferring a load. Actuators for moving the carrier relative to the vessel preferably in six degrees of freedom are coupled to the platform. A control system for driving the actuators is coupled to the actuators. Motion sensors which measure the motion of the vessel relative to at least one element in the surrounding area are provided. The measurements are used as input the for the control system.

SUMMARY

A loading system includes a loading arm. The loading arm has a process pipe which provides a conduit to carry fluid during a process of loading fluid by the loading arm. A hydraulic power unit is coupled as a control unit to the loading arm. The hydraulic power unit supplies hydraulic fluid to an actuator moving the loading arm to direct a free end of the loading arm during the process of loading fluid. A logic controller is coupled the hydraulic power unit. A first electronic sensor is electronically coupled to the logic controller. The first electronic sensor detects movement of a first structure to which the loading arm is mounted during the process of loading. The movement is relative to another second structure or the stationary world.

During the process of loading, signals from the electronic sensor, carry information about the relative movement and the signals are transmitted to the logic controller. The logic controller based, at least in part, on the signals from the electronic sensor, transmits signals to the hydraulic power unit, and wherein based on, at least in part, the transmitted signals of the logic controller, the hydraulic power supplies hydraulic fluid to the actuator of the loading arm to move the loading arm to compensate for relative movement between said first structure and the second structure.

The invention further concerns a method of loading fluid in an offshore loading system. The method includes determining relative movement, during a process of loading fluid by a loading arm, between a first structure and a second structure. As part of the method signals are transmitted based on the determination of the relative movement. Based on the transmitted signals, a control unit, especially a hydraulic power unit, supplies hydraulic fluid to an actuator to move the loading arm to compensate, at least in part, for the relative movement between the first and second structure.

BRIEF DESCRIPTION OF THE DRAWINGS

FIG. 1 is a schematic representation of an offshore loading system embodying an example of my invention; the system has a loading arm, a hydraulic power unit, an electronic controller, which is a programmable logic controller, and a motion reference unit (MRU) onboard a floating production and storage and offtake vessel; a second motion reference unit is onboard a cargo carrier vessel;

FIG. 2 is a stripped down representation of the type of loading arm used in FIG. 1.

DETAILED DESCRIPTION

Now referring to FIG. 1, loading arm 20 is coupled to a hydraulic power unit 22. The hydraulic power unit is coupled to or includes integrated therewith an electronic controller 24.

The electronic controller 24, which is a programmable logic controller, can be a microprocessor or a computer or other type of programmable logic controller. At least one first electronic acceleration sensor 26 is coupled to the programmable logic controller. The acceleration sensor 26 is a motion reference unit (MRU). A second electronic acceleration sensor 28 which is a motion reference unit MRU 28 is also coupled to the electronic controller 24.

One embodiment of the system, when ready for operation, is assembled with a floating production, storage and offtake or offloading (FPSO) vessel 30 for liquid natural gas and a cargo carrier (cc) vessel 32. The loading arm 20, hydraulic power unit 22, electronic controller 24 and first MRU 26 are onboard FPSO vessel 30. The second MRU 28 is onboard the cargo carrier 32. Both the first MRU 26 and second MRU 28 are electronically interfaced with the electronic controller 24. The electronic interface can be by way of a hard wiring system or by way of a wireless transmission system.

In operation the electronic controller 24 sends commands to the hydraulic power unit 22, at least in part, based on signals received from the first 26 and second 28 motion reference unit. The commands are calculated to cause the hydraulic power unit 22 to supply hydraulic fluid to the loading arm's actuators to move the loading arm 20 to compensate for the movement of the vessels 30, 32 relative to each other. The compensation allows for the free end 34 of the loading arm 20 to be smoothly directed to the cargo manifold 36 of the cargo carrier 32. Alternatively if the loading arm 20 is already connected to the cargo manifold, the compensation will result in the loading arm free end 34 tracking the movement of vessel 32 relative to vessel 30. By tracking the movement, the stresses on the loading arm 20 caused by the movement of vessel 32 relative to vessel 30 are reduced.

In more detail, FPSO 30 and cargo carrier 32, when in a body of water, such as a sea, may each surge, sway, heave, roll, pitch and yaw due to the impact of the sea's waves on the respective vessels. The various movements will cause each vessel to move relative to the stationary world such as the floor of the sea and relative to each other. The first and second motion reference units 26 and 28 detect the movement of each vessel 30, 32 relative to the stationary world. Thus motion reference unit 26 detects movement of the production storage vessel 30 relative to the stationary world. Second MRU 28 detects the movement of the cargo vessel 32 relative to the stationary world. The first 26 and second 28 MRU transmit signals to the electronic controller 24 concerning the movement of their respective vessels. Based on the signals the electronic controller 24 determines the relative movement between the production storage vessel 30 and cargo carrier 32. When the loading arm 20 is in the process of being connected to the manifold, the electronic controller 24 sends signals to actuate the hydraulic power unit 22 to supply hydraulic fluid to the loading arm's actuators 54, 58, 62 in a manner to move the sections of the loading arm 20 to compensate for the movement of the vessels 30, 32 relative to each other. The calculations are such that the sections of the loading arm 20 are driven (moved) by their actuators 54, 58, 62 so that unintended relative movement between the loading arm free end 34 and the manifold 36 of the cargo carrier 32 is as close as possible to zero. Accordingly, the only movement between the loading arm free end 34 and manifold 36 of the cargo carrier 32 is the movement caused by an operator to direct the free end 34 of the loading arm 20 to the manifold 36 of the cargo carrier 32. When the loading arm 20 is already connected to the manifold, the electronic controller 24 sends signals to actuate the hydraulic power unit 22 to supply hydraulic fluid to the loading arm's actuators 54, 58, 62 to move the loading arm free end 34 in a manner to track, as near as possible, the movement of the cargo manifold 36 of vessel 32 relative to vessel 30. By tracking the movement, the stresses on the loading arm 20 caused by movement of vessel 32 relative to vessel 30 are reduced.

In still further detail, the loading arm 20 has three actuators 54, 58, 62 which are the hydraulic piston cylinder type. These actuators can be called hydraulic cylinders 54, 58, 62. They are actuated by way of the hydraulic power unit 22 and can direct movement of the free end 34 of the loading arm 20 to the cargo manifold 36 of the cargo carrying vessel 32. The hydraulic power unit 22 additionally supplies hydraulic fluid to the hydraulic cylinders 54, 58, 62, based on commands from the electronic controller 24, to compensate for relative movement between the vessels 30, 32. As stated when the loading arm 20 is in the process of being connected to the manifold 36, the cylinders drive (move), the sections of the loading arm 20 such that the unintended movement of the free end 34 of the loading arm 20 relative to the cargo manifold 36, in all six degrees, is as near as possible, brought to zero. When the loading arm 20 is already connected to the manifold 36, the electronic controller 24 sends signals to actuate the hydraulic power unit 22 to actuate the hydraulic cylinders 54, 58, 62 to move the free end 34 of the loading arm 20 in a manner to track, as near as possible, the movement of the cargo manifold of vessel 32 relative to vessel 30. By tracking the movement, the stresses on the loading arm 20 caused by movement of vessel 32 relative to vessel 30 are reduced.

The below discussion details the features of loading arm 20 and how these features operate in the system. As shown in FIG. 2, the loading arm includes a standpost or riser 38. The riser 38 comprises an outer support conduit 39 and a portion 40a of process pipe 40. Process pipe 40 carries the fluid, which in this case is liquid natural gas, from the storage vessel 30 to the cargo carrier 32. The loading arm further includes and inner arm 42. The inner arm 42 includes a portion 40b of process pipe 40. It also includes support structure 41. A swivel joint 44 couples process pipe portion 40b at the fulcrum 46 to process pipe portion 40a. The swivel connection 44 allows inner arm 42, including process pipe portion 40b, to pivot relative to riser 38, including process pipe portion, 40a, up and down relative to the riser 38 as indicated by arrow 60 (FIG. 1).

The loading arm 20 further includes an outer arm 50. The outer arm 50 includes process pipe portion 40c and support structure 51. A swivel joint 48 couples process pipe portion 40c to process pipe portion 40b. The swivel connection allows outer arm 50, including pipe portion 40c, to pivot relative to inner arm 42, including process pipe portion 40b. The arm 50 pivots outward and backward relative to the inner arm as indicated by arrow 66 (FIG. 1). A portion of process pipe 40a towards the fulcrum includes a swivel joint 52 rotably connecting a first upper portion of process pipe 40a and to a second lower portion of process pipe 40a. The swivel connection allows the inner arm 42, including pipe portion 40b to rotate about the vertical axis of riser 38 in the direction indicated by arrow 56 (FIG. 1). In more detail the first upper pipe portion of process pipe 40a can rotate about the lower pipe portion of process pipe 40a.

A first hydraulic piston cylinder actuator, also called a slew cylinder, 54 is coupled to the first upper portion and second lower portion of process pipe 40a. The actuator 54 when actuated rotates inner arm 42, including process pipe portion 40b, about the vertical axis of riser 38 in the direction indicated by arrow 56 (FIG. 1).

A second hydraulic piston cylinder actuator, also called a primary cylinder 58, is coupled to the inner arm 42 and riser 38. The actuator 58 when actuated causes the inner arm 42 to pivot relative to the riser 38 up and down as indicated by arrow 60 (FIG. 1). A third hydraulic piston cylinder actuator, also called a secondary cylinder 62, is coupled to the inner arm 42 and outer arm 50. One end of the secondary cylinder 62 is coupled to the outer arm 50 via a linkage assembly 64. The secondary cylinder 62 when actuated causes the outer arm 50 to pivot outward and backward relative to the inner arm 42.

The hydraulic power unit 22 is fluidly coupled to each of the above three described hydraulic piston cylinder type actuators 54, 58, 62. The hydraulic power unit 22 when in operation supplies hydraulic fluid to the various actuators 54, 58, 62 to cause sections of the loading arm 20 to move about the swivel joints, as described above. An operator thus by commanding the hydraulic power unit can actuate the cylinders to move the loading arm free end 34 towards the cargo manifold 36. Additionally the electronic controller 24, based on signals received from the MRU's 26, 28 can send commands to the hydraulic power unit 22 to cause the unit 22 to supply hydraulic fluid to the acuators 54, 58, 62 to move the sections of the loading arm 20 to compensate for the movement of the vessels 30, 32 relative to each other. The compensation allows for the free end of the loading arm 20 to remain connected to the cargo manifold 36 in a manner which reduces stresses on the loading arm 20. The compensation achieves minimal stresses because the actuators 54, 58, 62 are moving the free end 34 of the loading arm 20 to track, as near as possible, the movement of the cargo manifold 36 relative to vessel 30. Accordingly the loading arm 20 is not being tugged and pulled on due to the movement of the vessels 30, 32 relative to one another. Also the compensation allows for the loading arm 20 to be smoothly directed to the cargo manifold 36 during the connection process because the unintended movement of the free end 34 of the loading arm 20 relative to the cargo manifold 36 is brought to, as near as possible zero. The following provides a first example of the workings of the system. In the first example the loading arm free end 34 is coupled to the manifold 36. In this example, the first MRU 26 detects that the production storage vessel 30 is stationary relative to the stationary world. The second MRU 28 detects that vessel 32 is heaving, moving up. The First MRU 26 transmits its signals to electronic controller 24. The second MRU 28 transmits its signals to the electronic controller 24. The electronic controller 24, based on the signals received from each of the MRU's 26, 28, makes a determination as to vessel 30's movement relative to vessel 32. In this particular example the electronic controller 24 determines that vessel 32 is moving up in the positive Z direction relative to vessel 30. To compensate for the relative upward movement of vessel 32, electronic controller 24 commands hydraulic power unit 22 to actuate hydraulic primary cylinder 58 to pivot the inner arm up, in the positive Z direction as indicated by arrow 68 (FIG. 2). It further commands the hydraulic power unit 22 to actuate secondary hydraulic cylinder 62 to pivot outer arm 50 outward relative to inner arm 42 in the direction indicated by arrow 70 (FIG. 2). In this example it is the hydraulic piston cylinder actuators that cause the free end 34 of the loading arm 20 to move as opposed to vessel 32 causing the free end 34 to move. The free end 34 of the loading arm 20 thus tracks the movement of the cargo manifold 36 and thus minimizes stresses on the loading arm 20 caused by relative movement of the vessels 30, 32.

In a second example the free end 34 of the loading arm 20 is again coupled to the cargo manifold 36. Vessel 30 is stationary relative to the stationary world. Vessel 32 is surging forward in a positive direction relative to the stationary world. The first and second MRU's 26, 28 send signals to the electronic controller 24. The electronic controller 24 based on the signals determines the movement of vessel 32 relative to vessel 30 to be a surge forward. Electronic controller 24 to compensate for the movement, sends signals to the hydraulic power unit 22 to cause the hydraulic power unit 22 to supply hydraulic fluid to actuate the hydraulic cylinders of the loading arm 20 so that the loading arm's free end 34 tracks, as near as possible, the cargo manifold's movement relative to vessel 30. To track the movement, the slew piston cylinder actuator 54 is actuated to rotate the inner arm in the direction of the surge forward. The secondary piston cylinder actuator 62 is actuated to pivot the outer arm outward relative to the inner arm. The primary piston cylinder actuator 58 is actuated to pivot the inner arm downward in the negative Z direction.

Although the system has been described as using two MRU's, the system could use a single sensor such as an optical or photographic sensor to detect the movement of vessel 32 relative to vessel 30. The sensor could be mounted on either vessel. The sensor would be electrically coupled to the electronic controller. The controller would interpret the signals from the one sensor to determine the movement of vessel 32 relative to vessel 30. The controller would than activate the hydraulic power unit to drive the loading arms via the cylinders to compensate for the relative movement. The term hydraulic cylinder as used herein refers generally to an actuator of the hydraulic piston cylinder type.

The system has been described with respect to the loading and off-loading of liquefied natural gas (LNG). The system can be used for all types of fluids. For instance the fluids can be liquefied petroleum gas, all types of crude oil, all types of fuels, chemicals or anything else that flows and is transported in bulk.

The electronic acceleration sensor shown is an MRU. The invention is not limited to only an MRU type electronic acceleration sensor. Other electronic acceleration sensors will work.

The diameter of the process pipe and free end can vary. The diameter can vary from 4" to 20".

All of the features disclosed in this specification (including any accompany claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An offshore loading system operable to load a fluid between a first structure and a second structure separate from the first structure, the offshore loading system comprising:
   a loading arm having a process pipe which provides a conduit to carry fluid during a process of loading the fluid by said loading arm, said loading arm mounted to the first structure;

a control unit coupled to said loading arm and operable to direct a free end of said loading arm;

an electronic logic controller coupled to said control unit;

a first electronic acceleration sensor electronically coupled to said logic controller, said first electronic acceleration sensor adapted to detect movement of said first structure relative to the stationary world; and a second electronic acceleration sensor electronically coupled to said logic controller, said second electronic acceleration sensor adapted to detect movement of said second structure relative to the stationary world, wherein the logic controller determines a relative movement between the first structure and the second structure based at least in part on movement detected by the first electronic accelerometer and the second accelerometer, and wherein said movement is detected when the free end is connected to the second structure and when the free end is not connected to the second structure.

2. The offshore loading system of claim 1, wherein said logic controller transmits signals to said control unit, and wherein said control unit controls actuators to move said loading arm to compensate for relative movement between said first structure and said second structure.

3. The offshore loading system of claim 1, wherein said control unit is a hydraulic power unit and wherein said hydraulic power unit supplies hydraulic fluid to said actuators to move said loading arm to compensate for relative movement between said first structure and said second structure.

4. The offshore loading system of claim 1, wherein the first structure and second structure are vessels floating on water.

5. The offshore loading system of claim 1, wherein said second structure is fixedly mounted to the stationary world and said first structure is a vessel floating on water.

6. The offshore loading system of claim 1, wherein the first electronic acceleration sensor is a motion reference unit.

7. The offshore loading system of claim 2, wherein the movement of said first structure relative to said second structure is detectable during control of said actuators.

8. The offshore loading system of claim 2, wherein the movement of said first structure relative to said second structure is detectable during movement of the free end of said loading arm.

9. A method of loading fluid comprising:

detecting relative movement between a first structure to which a loading arm is mounted and the stationary world with a first electronic acceleration sensor and transmitting signals based on said detected movement from said first electronic acceleration sensor;

detecting relative movement between a second structure and the stationary world with a second electronic acceleration sensor and transmitting signals based on said detected movement from said second electronic acceleration sensor;

determining relative movement, during movement of a free end of said loading arm to a manifold of a second structure, between the first structure and the second structure based, at least in part, on said signals transmitted by said first electronic acceleration sensor and the second electronic acceleration sensor;

transmitting signals based on said determination;

controlling, based on said transmitted signals, the free end of said loading arm in a manner which compensates, at least in part, for the relative movement between the first structure and the second structure; and coupling said free end to said manifold.

10. The method of loading fluid of claim 9, wherein said controlling said free end of said loading arm further comprises transmitting hydraulic fluid from a hydraulic power unit to actuators of said loading arm based on said signals transmitted.

11. The method of claim 9, wherein the movement determined is in all six degrees.

12. The method of claim 9, wherein the first acceleration sensor is a motion reference unit.

13. The offshore loading system of claim 1, wherein the control unit is arranged to receive a user input indicative of the desired movement of the free end of said loading arm and a signal indicative of the relative movement between the first structure and the second structure, and wherein the control unit controls a plurality of actuators to compensate for the relative movement to move the free end the desired movement.

14. The offshore loading system of claim 1, wherein the control unit is arranged to receive a signal indicative of the relative movement between the first structure and the second structure, and wherein the control unit controls a plurality of actuators to move the free end in the same manner as the second structure.

* * * * *